United States Patent [19]

Morgan

[11] 4,070,326
[45] Jan. 24, 1978

[54] ANISOTROPIC SULFURIC ACID DOPES OF POLYAMIDE HYDRAZIDES

[75] Inventor: Paul Winthrop Morgan, West Chester, Pa.

[73] Assignee: E. I. Du Pont de Nemours and Company, Wilmington, Del.

[21] Appl. No.: 642,010

[22] Filed: Dec. 18, 1975

[51] Int. Cl.$^2$ .............................................. C08R 5/36
[52] U.S. Cl. ............................ 260/30.8 R; 260/78 R
[58] Field of Search ...................... 260/30.8 R, 78 R

[56] References Cited

U.S. PATENT DOCUMENTS

| 3,418,275 | 12/1968 | Stephens | 260/30.8 R |
|---|---|---|---|
| 3,767,756 | 10/1973 | Blades | 260/30.8 R |
| 3,775,361 | 11/1973 | Jensen | 260/30.8 R |
| 3,819,587 | 6/1974 | Kwolek | 260/30.2 |
| 3,869,430 | 3/1975 | Blades | 260/30.8 R |

FOREIGN PATENT DOCUMENTS 132,150    1974    Japan.

OTHER PUBLICATIONS

Frazer et al., Journal of Polymer Science A-2, (1964), pp. 1147–1156.

Primary Examiner—William E. Schulz

[57] ABSTRACT

This invention relates to novel film- and fiber-forming optically anisotropic polyamide-hydrazide solutions (dopes) which are prepared in a solvent system comprising concentrated sulfuric acid or a mixture thereof with fluorosulfonic acid.

4 Claims, No Drawings

ANISOTROPIC SULFURIC ACID DOPES OF POLYAMIDE HYDRAZIDES

BACKGROUND OF THE INVENTION

The advantages of certain optically anisotropic spinning solutions are shown in Blades U.S. Pat. No. 3,767,756. Solutions of polyhydrazides consisting essentially of repeating units

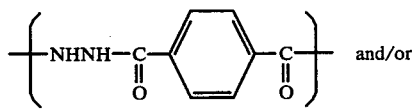 and/or

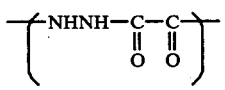

in sulfuric acid (at least 99.5% concentration) or in mixtures thereof with up to 80% fluorosulfonic acid are isotropic. The present invention provides certain polyamide-hydrazides that do form optically anisotropic solutions in these solvent media.

SUMMARY OF THE INVENTION

This invention provides novel, optically anisotropic spinning solutions of film and fiber-forming polymers comprising at least 5% by weight of a polyamide-hydrazide consisting essentially of repeating units

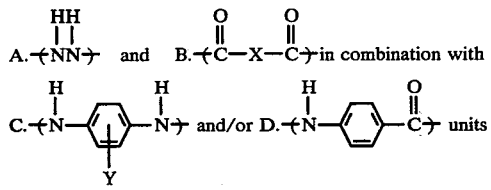

wherein the divalent radical —X— in repeating units may be the same or different and is a bond or 1,4-phenylene; wherein Y is a hydrogen atom or a methyl or chloro radical; the B units and the total A and C units are present in substantially equimolar amounts; and the total of C and D units is from 15 to 50 mole percent based on the total of A, C and D units present in the polymer; in sulfuric acid of at least 99.5% but not greater than 102% concentration or in a mixture thereof with fluorosulfonic acid. Polymers useful for fiber and film production by extrusion of the aforementioned solutions have an inherent viscosity of at least 0.4 preferably at least 0.7 and most preferably at least 1.0 measured as described hereinafter.

Polyamide-Hydrazides

The polyamide-hydrazides may be prepared from appropriate monomers by a low temperature (i.e., 0°-50° C) solution polymerization in solvent systems comprising mixtures of hexamethylphosphoramide (HMPA) and N-methylpyrrolidone (NMP), preferably used in volume ratio of about 2:1.

Suitable monomers include p-phenylenediamine, chloro-or methyl-p-phenylenediamine, terephthaloyl chloride, oxalyl chloride, terephthaloyl dihydrazide, hydrazine, hydrazine hydrate, p-aminobenzoylchloride hydrochloride, and p-aminobenzoylhydrazide.

The polyamide-hydrazides containing

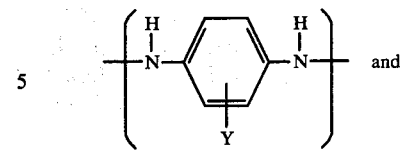 and

units may be prepared by first combining the desired dihydrazides with the appropriate quantity of mixed amide solvents. Optionally, the aromatic diamine may be added to the reaction vessel at this time, also. This mixture is then heated, e.g., to as high as about 100° C (to assist dissolution of the dihydrazide), after which the contents of the reaction vessel are cooled, e.g., to within 20°-40° C. If it were not previously introduced into the reaction vessel, the diamine(s) is added at this time. The diacid chloride(s) is then added to the reaction vessel, optionally with cooling to about 5° C. The polymerization is allowed to proceed (e.g., up to 2½-3 hours) while the temperature of the reaction is maintained below about 50° C via, e.g., ice-cooling. The polymer may be precipitated by combining the reaction mixture with water. The precipitated polymer is collected, washed with water and acetone, and dried overnight in a vacuum oven before being stored prior to use.

The polyamide-hydrazides containing

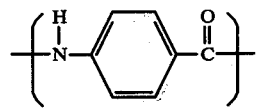

units may be prepared by the low temperature (i.e., below 60° C and preferably within 0°-30° C) solution polymerization of p-aminobenzoyl hydrazide and terephthaloyl chloride in a suitable medium such as, e.g., dimethylacetamide (DMAc); NMP; HMPA; and N,N,N',N'-tetramethylurea. Other useful polymerization media are N-methylcaprolactam; N,N-dimethylbutyramide; N,N-dimethylisobutyramide; and N,N-dimethylpropionamide.

The appropriate quantities of monomers are combined in one or more of the above-listed solvents and the resulting solution is stirred for from a few minutes to several hours. The reaction mixture is combined with a non-solvent, e.g., water or tetrahydrofuran, to precipitate the polymer which is collected, washed well with water and alcohol, and vacuum dried.

In preparing these polyamide-polyhydrazides, chain terminators may be used. Among the suitable chain terminators are compounds which can react monofunctionally with the acid chloride ends of these polymers, such as ammonia, ethylamine, dimethylamine, diethylamine, aniline, etc. Other terminators include hydroxylic compounds, such as methyl alcohol, ethyl alcohol, isopropyl alcohol, phenol and water. Useful terminators which react monofunctionally with the amine ends of these polymer chains include other diacid chlorides, e.g., acetyl chloride, acid anhydrides, e.g., acetic anhydride, and isocyanates, e.g., phenyl isocyanate.

Preparation of the Optically Anisotropic Solutions

The solvents useful for preparing the solutions of this invention are (1) concentrated sulfuric acid within the concentration range of about 99.5 to 102%, preferably 100 to 101% $H_2SO_4$, and (2) mixtures thereof with fluorosulfonic acid (up to 80%).

The solutions are prepared by first combining, under anhydrous conditions and with stirring and mixing, suitable quantites of the appropriate polymer or copolymer with the sulfuric acid or the acid mixtures to form compositions containing from about 5 to 25% by weight polymer, or even higher preferably about 15 to 20% by weight. Generally during addition of the polymer, the heat of mixing should be controlled in order that the temperature of the combined ingredients does not exceed 30° C, preferably not over 15° C. This may be accomplished by using cooled samples of acid(s), application of external cooling baths to the mixing vessel, controlled rate of addition of the solid material, appropriate stirring action, and/or combinations of these procedures. However, in some instances, it may be desirable to employ the acid(s) at room temperature or even in a moderately heated state, e.g., at about 50° C, to achieve more rapid dissolution of the added polymeric solid. During preparation and spinning, solutions should be maintained at temperatures which reduce the opportunity for polymer degradation to occur.

Excessive water can interfere with the formation of solutions suitable for spinning and can contribute to degradation of the polymer. Solutions should be prepared with relatively dry polymer samples under conditions where exposure to atmospheric moisture is minimized, e.g., under a blanket of dry nitrogen.

It will be noted that some of the solutions are solid at room temperature and must be heated as well as stirred to obtain sufficient fluidity for spinning.

Anisotropic Character of the Solutions

With solutions that are optically anisotropic, a bulk solution sample depolarizes plane-polarized light because the light transmission properties of the microscopic areas of the solution vary with direction. This characteristic is associated with the existence of at least part of the solution in the liquid crystalline or mesomorphic state. The liquid crystalline state of the optically anisotropic solutions of this invention is believed to be of the nematic type.

The solutions which exhibit optical anisotropy do so while the solution is in the relaxed state. This is in contrast to conventional polymeric solutions which may be caused to depolarize plane-depolarized light when subjected to appreciable shear.

There is a complex relationship existing among, e.g., the concentration of the particular polymer species, the inherent viscosity thereof, the solvent system, and the solution temperature which generally determines the ranges in which a given solution is anisotropic or isotropic. Clearly not all combinations will yield anisotropic solutions. A useful polymer concentration-solution viscosity relationship exists for given polymer-solvent combinations which are capable of forming the anisotropic solutions of this invention. For such combinations, the solution formed is isotropic when the polymer concentration is below a particular level. As the concentration of the polymer is increased, the viscosity of the solution increases. However, at a point referred to herein as the "critical concentration point" there is a sharp discontinuity in the slope of the viscosity $v$. concentration curve when the solution changes from isotropic to partially anisotropic without the formation of a solid phase. Further addition of polymer results in a descrease in the viscosity of the solution as it becomes more anisotropic. An exemplary viscosity vs. concentration curve may be prepared as shown for the anisotropic systems described in U.S. Pat. No. 3,671,542. The "critical concentration point" (as well as the complete viscosity v. concentration curve) may be determined as described in column 11 of U.S. Pat. No. 3,671,542.

A qualitative determination of optical anisotropy in the solutions of this invention can be conveniently made using a light source, analyzer, and crossed polarizer (or equivalents thereof). Commercially available polarizing microscopes may be useful for the qualitative determination of optical anisotropy for the solutions of this invention, as may pieces of Polaroid ® HN film. For those solutions which are solid at room temperature, heating is required to provide a fluid solution for analysis in the microscope.

Another qualitative determination of the anisotropic character of these solutions may be made with the naked eye. These solutions may appear turbid or hazy and yet contain no or practically no undissolved solid. When the solution, seen under reflected ordinary light, is disturbed by shaking or rolling the vessel containing the solution, or by only slow stirring, there is produced a characteristic, readily observed, satin-like sheen or glow which is observed even after the disturbance ceases, and which decreases in intensity thereafter. This may be described as being a pearly or opalescent quality of the solution. Solutions which are disturbed as described above often give the appearance of having striations and/or graininess in the surface. These visual effects are observed in the anisotropic solutions of this invention. This may commonly be referred to as "stir opalescence". Further details on qualitative and quantitative determinations of optical anisotropy are presented in U.S. Pat. No. 3,671,542. The latter patent describes the improved properties (e.g., higher tenacity and initial modulus) in fibers spun from anisotropic, rather than isotropic, systems. In the examples which follow, optical anisotropy was determined by stir opalescence or with a polarizing microscope.

Shaped Article Preparation

The above-described solutions may be formed into shaped articles, e.g., films, fibers, and fibrids. Useful films may be cast, using a variety of quenching media. Fibers of high quality may be prepared from these solutions by spinning them into suitable baths. Fibrids, useful for paper preparation, may be prepared from these solutions by means of the procedures described in Morgan — U.S. Pat. No. 2,999,788, using a suitable coagulant.

While these acidic solutions may be spun into fibers by conventional wet spinning techniques, it is preferred that fibers be prepared by extruding the solutions through a short layer of gas, e.g., air, as described in Blades U.S. Pat. No. 3,767,756. Spinnerets and other apparatus should be constructed of materials resistant to the strong acids used. The thickness of the layer separating the spinneret face from the coagulating bath can vary from 0.1 to 5 cm and is preferably from about 0.2 to 1.3 cm thick. A variety of baths may be used to coagulate the solution into fibers. Satisfactory results have been obtained with aqueous baths, as shown in the examples.

Due to the degradative effects of even small amounts of residual acid in the fiber samples, the complete removal of the spinning solvent is very important for the attainment of high strength fibers. Water alone or combinations of alkaline solutions and water may be used for acid removal.

It will be understood that additives, inert to the solvent, as dyes, fillers, antioxidants, etc., can be incorporated into these solutions for the purposes intended, prior to shaped article preparation.

MEASUREMENTS AND TESTS

Inherent Viscosity: Inherent viscosity ($\eta$inh) is defined by the following equation:

$$\eta\text{inh} = \ln (\eta\text{rel})/C$$

wherein ($\eta$rel) represents the relative viscosity and C represents a concentration of 0.5 gram of the polymer in 100 ml of solvent. The relative viscosity ($\eta$rel) is determined by dividing the flow time in a capillary viscometer of a dilute solution of the polymer by the flow time for the pure solvent. The dilute solutions used herein for determining ($\eta$rel) are of the concentration expressed by (C), above; flow times are determined at 30° C; unless otherwise specified, the solvent is sulfuric acid (100%).

Fiber Tensile Properties: Filament tensile properties are measured as described in U.S. Pat. No. 3,836,498 (col. 6).

EXAMPLE 1

This example illustrates (1) the preparation of the polyamide-hydrazide from p-aminobenzoyl hydrazide and terephthaloyl chloride, (2) an anisotropic solution thereof, and (3) fibers thereof.

To a stirred solution of 27.21 g (0.18 mole) of p-aminobenzoylhydrazide in an ice-cooled mixture of 300 ml of HMPA and 300 ml of NMP are added 36.54 g (0.18 mole) of terephthaloyl chloride. After 15 minutes, a clear, viscous solution exists. The cooling bath is then removed and the stirred solution is allowed to warm up during the next 1¾hr. The solution is then combined with water to precipitate the polymer which is collected, washed separately with water and alcohol, and dried in vacuo at 90° C. There is obtained 56 g of product, $\eta$inh = 5.3 (dimethyl sulfoxide/5% LiCl).

An anisotropic spinning solution is prepared by first combining, at room temperature and over a 0.5 hr period, a 50 g sample of the polyamide-hydrazide described above with 200 g of concentrated sulfuric acid (100.65% by weight $H_2SO_4$) to form a composition containing 20% polymer. This is transferred to a twin cell spinning unit, described in Blades U.S. Pat. No. 3,767,756, mixed (9 passes), and spun according to the procedure shown below.

The above-prepared anisotropic solution, maintained at room temperature, is extruded through a spinneret (10-hole, each hole of 0.002 in. diameter, maintained at room temperature) into an aqueous coagulating bath maintained at 1° C and positioned ½in. vertically below the face of the spinneret. The filaments emerging from the coagulating bath are washed with water and wound up at the rate of 606 ft/min. The washed and dried filaments exhibit the following tensile properties: T/E/-Mi/Den.: 4.5/3.8/244/2.4. The polymer has the following repeating units in equimolar amounts:

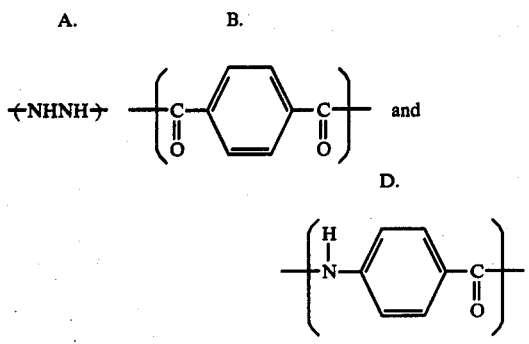

EXAMPLE 2

This example illustrates the preparation of a copolyamide-hydrazide, using p-phenylenediamine and oxalyl dihydrazide.

In a one-liter resin kettle are placed oxalyl dihydrazide (0.207 mole), p-phenylenediamine (0.089 mole), HMPA (830 ml), and NMP (415 ml). This mixture is heated to about 45° C for about 30 –40 minutes to assist further dissolution of the oxalyl dihydrazide, after which it is cooled in an ice bath to about 20° C. Terephthaloyl chloride (0.296 mole) is added to the reaction mixture with moderate stirring. The temperature of the reaction mixture is maintained below 45°–50° C. by use of an ice-water bath. The reaction is allowed to proceed for 2 hr, after which the reaction mixture is combined with water to precipitate the copolymer which is collected, extracted with water in a blender, rinsed on a fritted glass funnel with acetone, and dried overnight in a vacuum oven at 100° C. The sample of the copolyamide-hydrazide thus obtained exhibits an inherent viscosity of 1.84 The polymer has the following repeat units

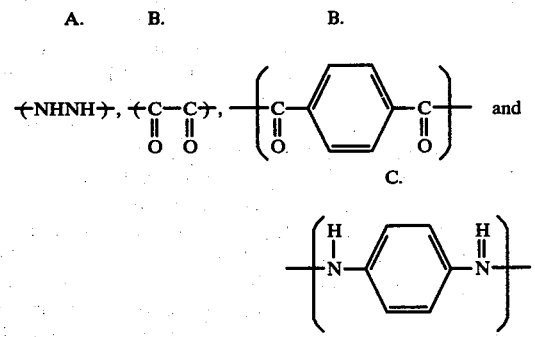

with the total of A and C units being present in substantially equimolar amounts with the total B units and the C units being present in the amount of about 18 mole percent based on the total of A and C units.

EXAMPLE 3

This example illustrates the preparation of a copolyamide-hydrazide consisting essentially of repeating units of the formula

A. B.

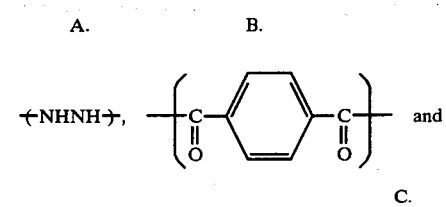 and

C.

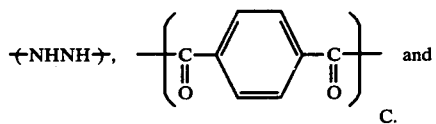

with the total of A and C units being present in substantially equimolar amounts to the B units, and the C units being present in the amount of about 33 mole percent based on the total A and C units.

In a two-liter resin kettle is placed terephthaloyl dihydrazide (28.7 g, 0.148 mole) and 1,500 ml of a mixture of HMPA (950 ml) and NMP (450 ml). These ingredients are heated to 140° C to form a solution which is then cooled to about 40° C. p-Phenylenediamine (15.96 g, 0.148 mole) is dissolved in the cooled solution. The solution is then further cooled to about 5° C, after which terephthaloyl chloride (60 g, 0.296 mole) is added in one portion, with stirring. The ingredients are stirred for 2 hours while being cooled to maintain the reaction temperature below 50° C. The polymer is precipitated, collected, washed, and dried. There is obtained 85 g of copolyamide-hydrazide, $\eta$inh = 0.66.

EXAMPLE 4

This example describes the preparation of anisotropic solutions of the copolymer described in Example 2 above, and the spinning of fibers from this solution. The solvent used for spinning solution preparation is a mixture of concentrated sulfuric acid (100% $H_2SO_4$) and fluorosulfonic acid (1/1 wt ratio). Copolymer content of the solution is 20% by weight.

For preparation of the spinning solution, the mixture of acids (200 g) is pre-cooled to about 0° C (frozen acid employed for 100% $H_2SO_4$) and 50 g of the copolymer are stirred into the cooled acid. Continuous cooling (acetone/solid carbon dioxide) is used to moderate the very exothermic interaction which occurs. The ingredients are stirred by hand to a thoroughly homogeneous slurry which is transferred to a twin cell unit described in Blades U.S. Pat. No. 3,767,756 wherein it is preheated to about 10° C above the melting point of the mixture, e.g., to about 40° to 50° C, to form a solution. The cells are immediately placed in a preheated bath (30° to 50° C) and the solution is mixed by performing 10 complete passes through the cells (begun as soon as the cells are immersed in the bath). The solution is then spun through a spinneret (10 holes, 0.003 in. diam.) into an aqueous coagulating bath maintained at 3° C. The spinneret face is positioned vertically 10 mm above the surface of the coagulating bath. The yarn samples which are collected are soaked for at least 12 hours in distilled water and air dried before being submitted for filament tensile property determination. The filament tensile properties are as follows: T/E/Mi/Den. = 4.7/4.1/276/5.2.

I claim:

1. A novel optically anisotropic spinning solution of at least 5 percent by weight of a fiber- and film-forming polyamide-hydrazide consisting essentially of repeating units

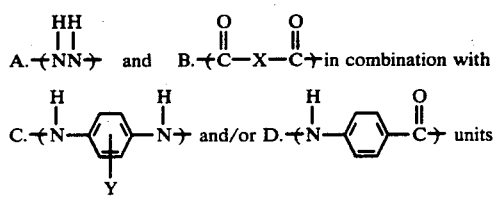

wherein the divalent radical —X— in repeating units may be the same or different and is a bond or 1,4-phenylene; wherein Y is a hydrogen atom or a methyl or chloro radical; the B units and the total A and C units are present in substantially equimolar amounts; and the total of C and D units is from 15 to 50 mole percent based on the total of A, C and D units present in the polymer; in sulfuric acid of at least 99.5% but not greater than 102% concentration or in a mixture thereof with fluorosulfonic acid.

2. A solution according to claim 1 wherein the polymer consists essentially of the following repeating units

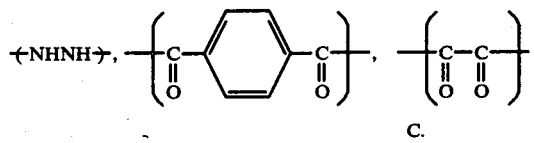

3. A solution according to claim 1 wherein the polymer consists essentially of the following repeating units

4. A solution according to claim 1 wherein the polymer consists essentially of the following repeating units

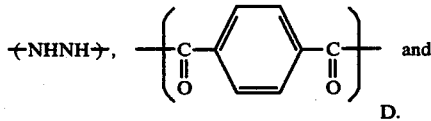

* * * * *